No. 691,724. Patented Jan. 21, 1902.
W. B. MASON.
BRAKE MECHANISM FOR MOTOR VEHICLES.
(Application filed Aug. 14, 1901.)
(No Model.)
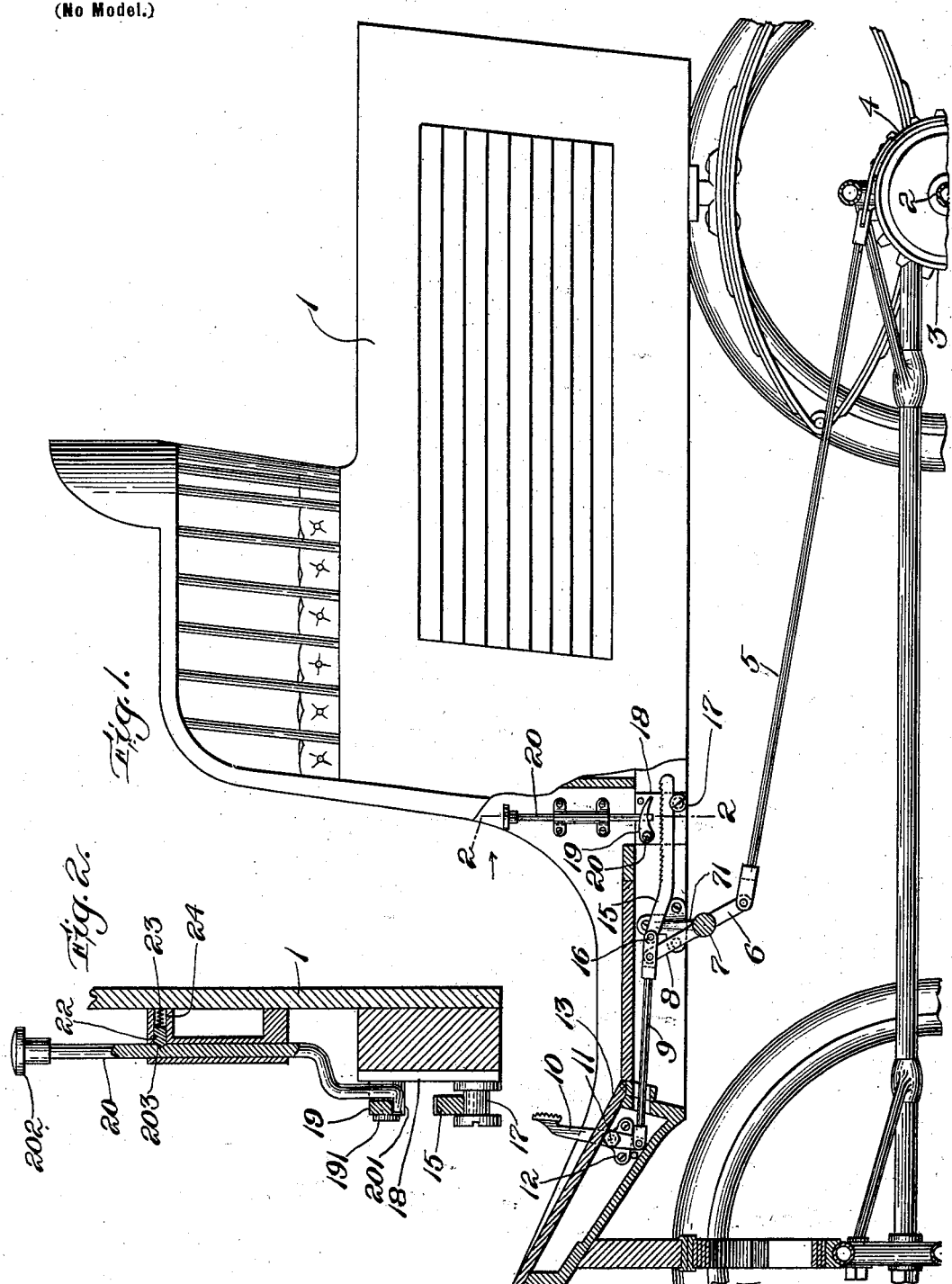

UNITED STATES PATENT OFFICE.

WILLIAM B. MASON, OF BOSTON, MASSACHUSETTS, ASSIGNOR TO THE MASON REGULATOR COMPANY, OF SACO, MAINE, A CORPORATION OF MAINE.

BRAKE MECHANISM FOR MOTOR-VEHICLES.

SPECIFICATION forming part of Letters Patent No. 691,724, dated January 21, 1902.

Application filed August 14, 1901. Serial No. 72,005. (No model.)

*To all whom it may concern:*

Be it known that I, WILLIAM B. MASON, a citizen of the United States, residing at Boston, in the county of Suffolk, State of Massachusetts, have invented a certain new and useful Improvement in Brake Mechanisms for Motor-Vehicles, of which the following is a specification, reference being had therein to the accompanying drawings.

Self-propelled or motor vehicles are provided with brakes for use in controlling the motion thereof; but inconvenience frequently is experienced in consequence of the fact that when the brake is applied the brake action is not maintained unless continuous attention is paid thereto and pressure upon the operating pedal or lever kept up by the person operating the vehicle. When the vehicle is stopped on a sloping road, unless precautions are taken it is liable to move downgrade, and even when care is observed to take measures whereby to prevent undesired movement of the vehicle it sometimes becomes started and moves down the inclined surface, breakages and personal injuries being the outcome.

The aim of the invention is to obviate the inconvenience and tendency to accident aforesaid; and to this end the invention consists in the combination, in a self-propelled or motor vehicle, with the brake mechanism, of locking devices by means of which the brake after being applied is held applied with full force and effect until at the will of the operator the said devices are actuated to release the brake action.

I have represented the invention in the accompanying drawings, in which—

Figure 1 shows, mainly in side elevation, certain portions of a self-propelled or motor vehicle having the invention applied thereto, parts being in section in order to illustrate more clearly features which otherwise would be concealed from view. Fig. 2 is a sectional detail, on an enlarged scale, on the plane indicated by the dotted line 2 2 in Fig. 1.

The vehicle-body is designated 1, one of the axles being partially indicated at 2, with the brake-wheel thereon at 3. 4 is a brake-band or equivalent device of any suitable or approved character acting in connection with the said brake-wheel, and 5 is a connecting-rod extending from the said brake-band forward to an arm 6 on a rock-shaft 7, having an arm 8, with which is connected pivotally a rod 9, extending forward and also connected pivotally with the lower arm of the pedal or operating-lever 10, the said lever being pivoted at 11 upon a suitable stand or bracket 12, which is attached to the front portion of the carriage-body beneath the floor 13. This is a customary and well-known arrangement of brake and operating connections therefor. The particular construction and arrangement shown and described are not essential to the invention, which is intended to be applied in connection with any of the forms of brake-operating mechanisms in use. The rock-shaft 7 is mounted in a support or supports at 71, attached to the forward portion of the carriage-body beneath the floor 13.

In carrying the invention into effect I connect suitably with a movable member of the brake-operating mechanism a rack-bar, as 15. This rack-bar may be variously applied and connected. Herein I have shown the same pivotally connected at 16 to the rear end of the rod 9 and resting at its free extremity upon a supporting stud or screw 17, projecting from a plate 18, attached to the carriage-body. This rack-bar will move in unison with the said rod 9. In connection with the rack-bar 15 I provide a detent 19, arranged to engage with the teeth of the said rack-bar and prevent reverse movement of the same and the connected parts. Herein the said detent is shown constituted by a pawl, which is pivoted at 191 to the plate 18. Engagement of the said pawl or detent with the rack-bar after the brake has been applied will hold the brake on until the pawl or detent is independently disengaged. For the purpose of enabling the pawl or detent to be disengaged at will I provide the releasing device, herein constituted by a vertically-movable rod 20, having the stem thereof fitted to a guide in a bracket 21, attached to the side of the carriage-body, as shown in the drawings, the said rod 20 having a lateral projection 201 extending outward therefrom beneath the pawl or detent. This rod is furnished at its upper end with a head 202 or other suitable handle for convenience in operating the same. When depressed, it permits the pawl or detent to become engaged with the teeth of the rack-bar and remain in engagement therewith. By raising the rod the projection 201 thereof is caused to lift the pawl or detent from the teeth of the rack-bar, thereby releasing the brake mechanism. In order that the rod may be caused to remain in its lowered position, so as to leave the pawl or detent free to engage at all times with the teeth of the rack-bar, I combine with the rod a suitable catch, here constituted by a small bolt 22, acted upon by a spring 23, which tends to press the same toward the rod, the said bolt and spring being contained in a chamber 24, with which the stand or bracket containing the guide for the rod is furnished. The rod is formed with a notch 203 in its side, and the corresponding end of the spring-actuated catch-bolt is shaped suitably to enter the said notch.

The action and manner of using the invention will be obvious from what precedes. Figs. 1 and 2 of the drawings show the rod in an elevated position, in which position it is maintained through the engagement of the spring-actuated catch therewith, as in Fig. 2. In this position the rod holds the pawl or detent away from the rack-bar connected with the brake mechanism, so as to leave the said brake mechanism free to be operated, as usual, during the running of the vehicle. In this position of the rod and the pawl or detent the latter does not act to modify in any way the usual working of the brake mechanism, and the brake accordingly is applied when the pedal or operating-lever is properly operated for the purpose by the person running the vehicle, the brake action being relieved when the pressure exerted upon the pedal or operating-lever is released. When, however, it is desired to enable the brake to remain continuously applied without necessity for maintaining close attention thereto or keeping up the pressure upon the pedal or operating-lever, the rod is depressed, releasing the pawl or detent and rendering the latter free to act in connection with the rack-bar. When now the pedal or operating-lever is moved in the direction proper for applying the brake, the engagement of the pawl or detent with the teeth of the rack-bar holds the parts of the brake mechanism in the position in which they have been set until by the lifting of the rod the pawl or detent is disengaged.

The invention enables the person running the vehicle to apply the brake with any degree of force required and then turn his attention to any other duties needing to be looked after without further concern respecting the brake, and it also enables the running-gear of the vehicle to be firmly locked when it is desired to leave the vehicle standing still, thereby preventing any undesired movement of the vehicle and guarding against accidents as a result thereof.

What I claim is—

1. In a self-propelled or motor vehicle, in combination, the brake mechanism, a lock to hold the brake in action after having been applied, a lock-disengager, and a catch to hold said disengager after it has been operated to place said lock out of operative relations with the brake mechanism.

2. In a self-propelled or motor vehicle, in combination, the brake mechanism, the rack-bar, the detent engaging therewith to lock the brake in action after the same has been applied, the controller for said detent, and means to retain said controller in place after it has been operated to render said lock inoperative.

In testimony whereof I affix my signature in presence of two witnesses.

WILLIAM B. MASON.

Witnesses:
ROBERT WALLACE,
WM. A. MACLEOD.